United States Patent
Wilcox

[11] Patent Number: 5,222,381
[45] Date of Patent: Jun. 29, 1993

[54] TETHERED HOLDER FOR VEHICLE SECURITY DEVICE

[75] Inventor: John R. Wilcox, Farrell, Pa.
[73] Assignee: Winner International, Sharon, Pa.
[21] Appl. No.: 796,334
[22] Filed: Nov. 22, 1991
[51] Int. Cl.$^5$ .................... B60R 7/00; E05B 73/00
[52] U.S. Cl. .................... 70/19; 248/316.4; 224/42.45 R; 70/58; 70/237; 70/209
[58] Field of Search .................... 70/209-212, 70/233, 237, 238, 225, 226, 14, 15, 17-19, 57, 58, 30, 49; 292/256, 258; 248/316.1-316.5; 224/311, 315, 323, 42.38-42.40, 42.45 R

[56] References Cited

U.S. PATENT DOCUMENTS

| | | | |
|---|---|---|---|
| 1,823,697 | 9/1931 | Nenstiehl | 70/15 X |
| 2,556,900 | 6/1951 | Buschhorn | 70/19 X |
| 2,666,612 | 1/1954 | Howell | 248/316.4 X |
| 3,706,403 | 12/1972 | Sikes | 224/42.45 R X |
| 3,792,775 | 2/1974 | Riddle et al. | 224/311 X |
| 4,208,026 | 6/1980 | Reynolds | 70/212 X |
| 4,738,127 | 4/1988 | Johnson | 70/209 |
| 4,842,174 | 6/1989 | Sheppard et al. | 224/42.45 R X |
| 4,949,559 | 8/1990 | Glines | 70/19 |
| 5,025,646 | 6/1991 | Waguespack, Jr. | 70/237 X |
| 5,127,562 | 7/1992 | Zane et al. | 70/233 X |
| 5,129,563 | 7/1992 | Dillon | 224/42.45 R X |

FOREIGN PATENT DOCUMENTS

| | | | |
|---|---|---|---|
| 992345 | 7/1976 | Canada | 70/19 |
| 9009911 | 9/1990 | PCT Int'l Appl. | |
| 1127524 | 9/1968 | United Kingdom | 70/226 |
| 2106058 | 4/1983 | United Kingdom | 70/226 |

Primary Examiner—Peter M. Cuomo
Assistant Examiner—Suzanne L. Dino
Attorney, Agent, or Firm—Body, Vickers & Daniels

[57] ABSTRACT

A tethered holder for a vehicle steering wheel lock bar having oppositely directed hooks for engaging diametrically opposite sides of a vehicle steering wheel comprises a body portion supporting a pair of hooks facing one another for engaging the oppositely directed hooks of the lock bar when the latter is disengaged from a steering wheel for storage in the vehicle. One of the hooks of the holder is displaceable relative to the other to facilitate attachment and detachment of the holder from the lock bar, and the holder is secured to the vehicle such as by a chain having a given length to limit displacement of the lock bar from its storage area in the event of sudden stopping of the vehicle.

51 Claims, 5 Drawing Sheets

TETHERED HOLDER FOR VEHICLE SECURITY DEVICE

BACKGROUND OF THE INVENTION

The present invention relates to the art of vehicle security devices of the type attachable to a vehicle steering wheel to limit rotation thereof and, more particularly, to a tethered holder for limiting displacement of the security device from a storage area in the vehicle during periods of non-use of the security device.

The present invention finds particular utility in connection with storage of a vehicle steering wheel lock bar of the type disclosed in U.S. Pat. No. 4,738,127 to Johnson and, accordingly, will be discussed and described herein in detail in conjunction with such a lock bar structure. At the same time, however, it will be appreciated that the invention is applicable to vehicle steering wheel lock bars structured other than that disclosed in the aforementioned patent and to other anti-rotation devices attachable to the vehicle steering wheel to limit or preclude rotation thereof.

It is of course well known to provide vehicles with anti-theft security devices attachable to the vehicle steering wheel to limit rotation of the steering wheel when the vehicle is parked. One such device is disclosed in U.S. Pat. No. 4,738,127 to Johnson which is assigned to the same assignee as the present application and the subject matter of which is incorporated herein by reference. The device disclosed in the Johnson patent is a steering wheel lock bar characterized by a pair of oppositely directed hooks engagable with diametrically opposite sides of a steering wheel. One of the hooks is on an elongated rod member adapted to move in telescopic fashion relative to a tubular body member carrying the other hook and extending outwardly beyond the periphery of the steering wheel to engage a part of the vehicle and preclude complete rotation of the steering wheel when the lock bar is mounted thereon. When the lock bar is removed from the steering wheel, the rod member is displaced to a storage position within the body member and in which the oppositely directed hooks are more closely spaced than when the lock bar is mounted on a steering wheel.

When the component parts of the lock bar are in the storage position thereof, the lock bar is suitably stored in the vehicle and, for ready access, is generally loosely stored in the driver's compartment and, for example, on the floor of the vehicle underneath or laterally adjacent the driver's or passenger's seat. Such loose storage of a steering wheel lock bar is potentially dangerous to the driver and/or passengers in the vehicle in the event of sudden stopping of the vehicle and, especially, when such sudden stopping is the result of head-on impacting of the vehicle with another vehicle or object. In this respect, such sudden stopping results in the potential for the lock bar to become a projectile within the vehicle endangering the driver and/or passengers.

SUMMARY OF THE INVENTION

In accordance with the present invention, a tethered holder is provided for limiting the displacement of a vehicle steering wheel mountable security device when the latter is detached from the steering wheel and stored in the vehicle. More particularly in this respect, the holder is attached to one end of a tether, such as a link chain, and the other end of the tether is secured to a rigidly fixed component of the vehicle such as a seat belt retainer mount or vehicle seat support channel, for example, or to a special mounting bracket for the holder secured to the vehicle floor or frame component. The holder is readily connectable to and disconnectable from the security device to facilitate use and storage of the latter, and the tether is of a predetermined length which, relative to its anchoring to the vehicle, limits displacement of the security device when connected thereto and precludes the security device becoming a projectile or otherwise being displaced from its storage area in a manner which could result in injury to the driver or a passenger or passengers in the vehicle in the event of sudden stopping of the vehicle. By facilitating the ease of connecting and disconnecting the holder relative to the security device, a person is encouraged to use the holder in connection with storage of the security device and, thus, promote the driver's and/or passenger's safety in connection with operation of the vehicle.

In accordance with preferred embodiments of the invention, the holder includes a pair of connector components displaceable between connected and released positions relative to the security device. When connected to the security device, the connector components of the holder are restrained from unintentional displacement to the released positions thereof and, at the same time, release of the holding device from the security device is readily achieved, thus promoting use of the holder. Use of a tether for the holder advantageously enables the security device to be stored completely under a vehicle seat, for example, so as to be out of sight, while providing for the holder to be readily accessible to achieve disconnection of the security device therefrom for use. More importantly, the tether provides the foregoing restraint against the security device becoming a projectile in the vehicle in the event of sudden stopping thereof.

It is accordingly an outstanding object of the present invention to provide a tethered holder for safely storing a vehicle steering wheel mountable security device within a vehicle.

Another object is the provision of a holder of the foregoing character which provides for limited displacement of the security device from a storage area therefor, thus to preclude the security device becoming a projectile in the vehicle in the event of sudden stopping thereof.

Yet another object is the provision of a holder of the foregoing character which can be readily connected to and disconnected from the security device so as to securely hold the latter relative to its storage area while promoting use thereof for its intended purpose.

Still another object is the provision of a holder of the foregoing character comprising a pair of connector components which are selectively displaceable between connected and released positions relative to the security device and which, in the connected disposition, secure the holder to the security device against unintended separation therefrom.

Yet another object is the provision of a holder of the foregoing character which is structurally simple, economical to produce and efficient in connection with its use and operation.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 7 is an elevation view, partially in section, taken along line 7—7 in FIG. 6; and, FIG. 8 is a cross-sectional elevation view of the holder taken along line 8—8 in FIG. 7.

DESCRIPTION OF PREFERRED EMBODIMENTS

Figure 1:
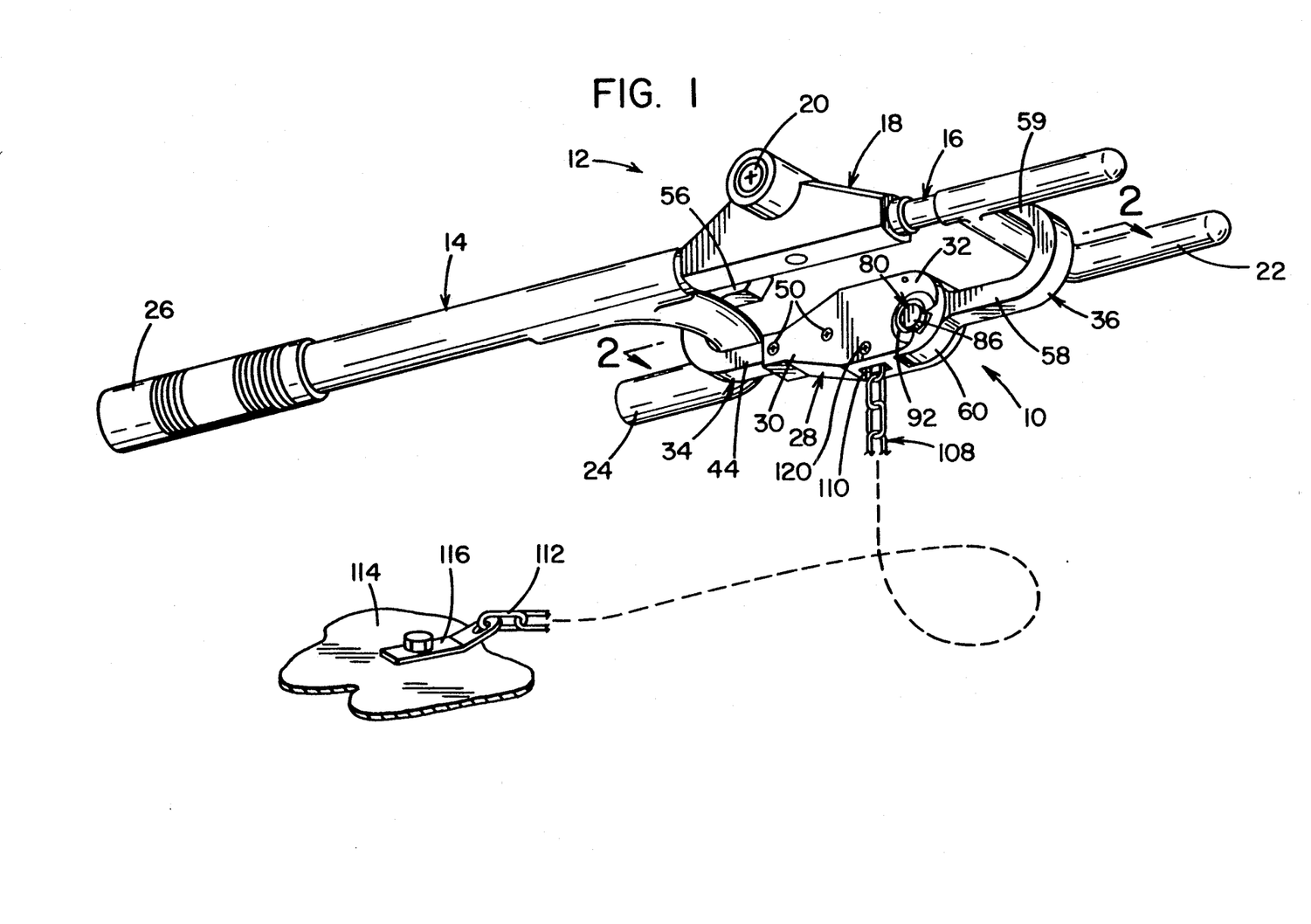
FIG. 1 is a perspective view of a tethered holder in accordance with the present invention connected to a steering lock bar.
Figure 2:
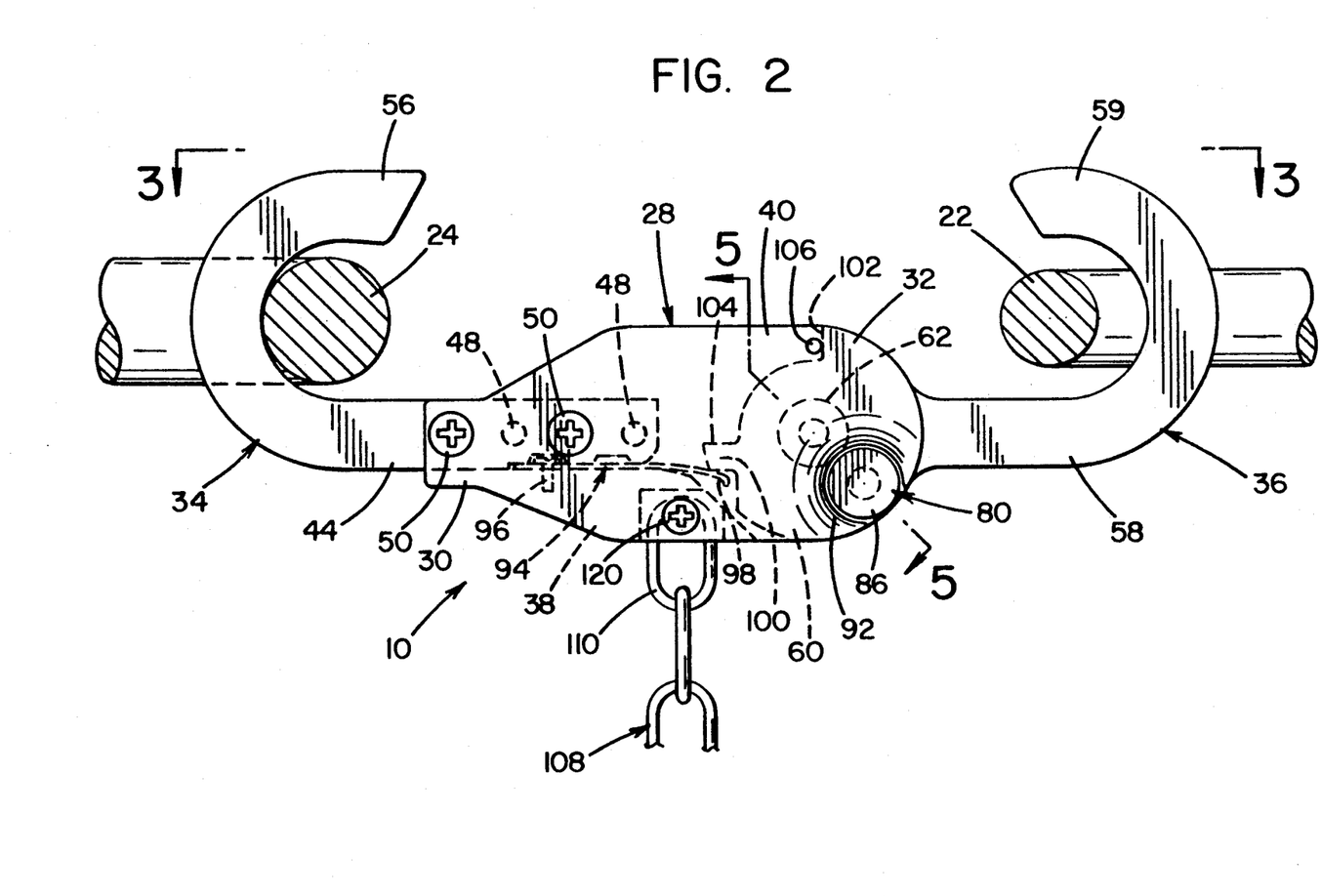
FIG. 2 is an elevation view of the holder taken along line 2—2 in FIG. 1.

Referring now in greater detail to the drawings wherein the showings are for the purpose of illustrating preferred embodiments of the invention only and not for the purpose of limiting the invention, a tethered holder 10 is illustrated in FIG. 1 of the drawing in its connected relationship with a vehicle steering wheel mountable security device 12 of the character disclosed in U.S. Pat. No. 4,738,127 referred to hereinabove. In this respect, security device 12 includes a tubular body member 14 axially slidably receiving an elongate rod member 16 through a lock housing 18 which includes a lock 20 for releasably securing rod member 16 in a desired axial position relative to body member 14. Rod member 16 includes a generally U-shaped hook 22 and body member 14 includes a generally U-shaped hook 24, which hooks 22 and 24 open in opposite directions relative to one another and provide engagement members for engaging diametrically opposite portions of a vehicle steering wheel when the security device is mounted thereon As is well known, mounting of security device 12 on a vehicle steering wheel is achieved by releasing rod member 16 and moving the latter and thus hook 22 outwardly of body member 14 and hook 24 until the hooks are in engagement with diametrically opposite sides of the steering wheel, and then locking the rod member in the latter position. As is further well known, when the security device is so mounted outer end 26 of body member 14 extends beyond the periphery of the steering wheel so as to engage an interior surface of the vehicle, or a person attempting to operate the same, and precludes rotation of the steering wheel for the latter purpose. When the security device is removed from the steering wheel for storage, rod member 16 is displaced inwardly of body member 14 to the position shown in FIG. 1 and, as described more fully hereinafter, holder 10 is connected with hooks 22 and 24 so as to secure the security device in a storage area therefor in the vehicle.

Figure 3:
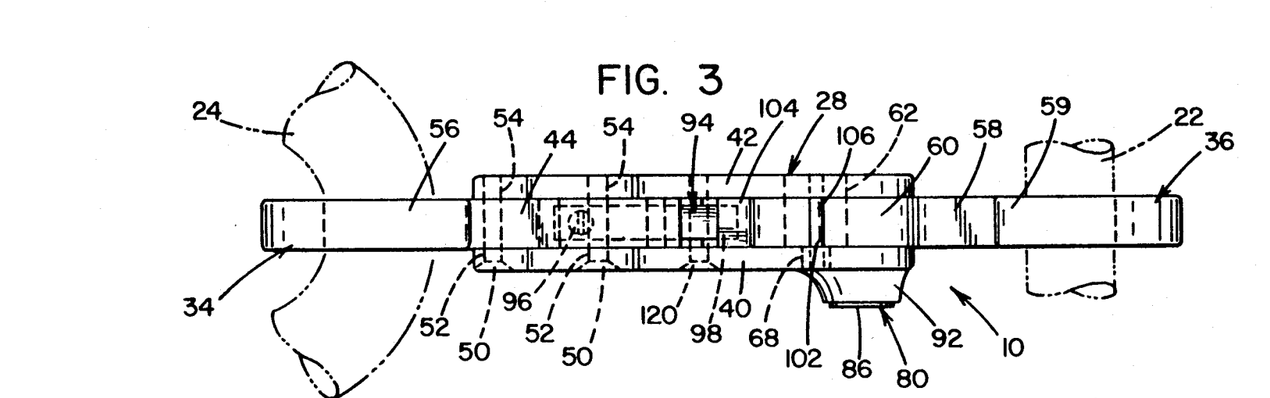
FIG. 3 is a plan view of the holder taken along line 3—3 in FIG. 2.
Figure 4:
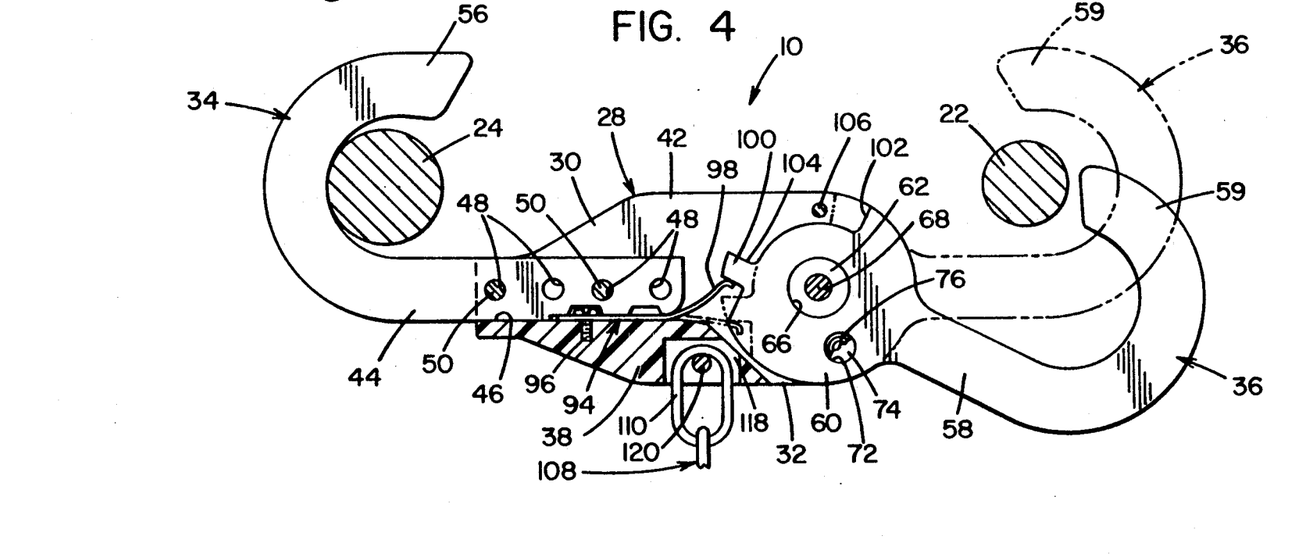
FIG. 4 is an elevation view of the holder, partially in section, showing the connectors thereof in released position relative to the lock bar.

As seen in FIGS. 1-5, holder 10 is comprised of a body portion 28 having opposite ends 30 and 32, a connector 34 at end 30, and a connector 36 at end 32. In this embodiment, body portion 28 and connectors 34 and 36 are of a suitable high impact strength plastic material such as Delrin. As best seen in FIGS. 3 and 4, body 28 includes a bottom portion 38 and laterally spaced apart side walls 40 and 42 integral with and extending upwardly from bottom portion 38 between ends 30 and 32 of the body. Connector 34 is in the form of a U-shaped hook having a leg 44 extending into body 28 from end 30 between side walls 40 and 42 and in overlying relationship with the upper surface 46 of bottom portion 38. Leg 44 is provided with a plurality of spaced apart openings 48 therethrough, and leg 44 and thus hook 34 is adapted to be adjustably secured to body 28 by means of a pair of threaded fasteners 50. Fasteners 50 extend through openings 52 therefor in side wall 40, through a pair of the openings 48 and then into threaded openings 54 provided therefor in side wall 42. The provision of the extra openings 48 advantageously provides for adjusting the axial position of hook 34 relative to body 28 for the purpose set forth hereinafter. Hook 34 further includes a leg 56 which, together with leg 44, provides for the open end of the hook to face inwardly toward end 30 of body 28.

Figure 5:
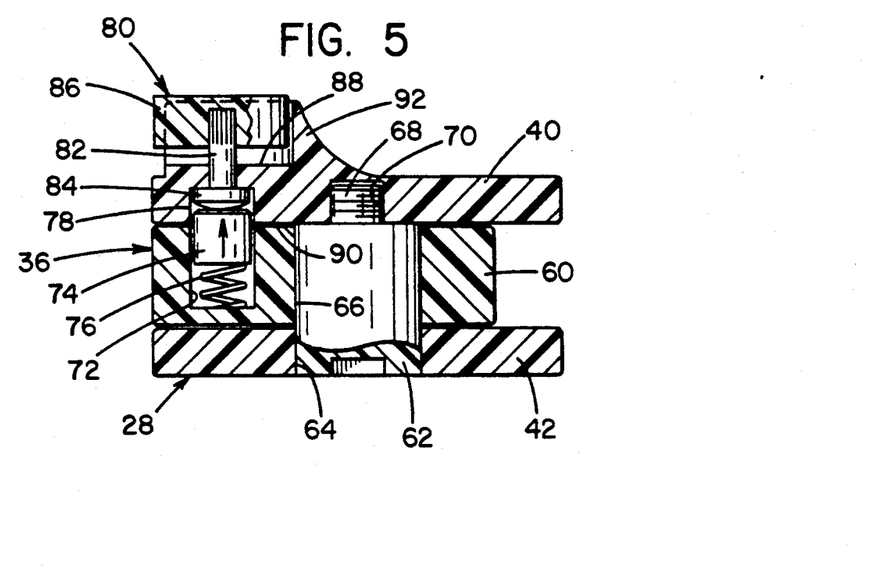
FIG. 5 is a cross-sectional view through the holder taken along line 5—5 in FIG. 2.

Connector 36 is also in the form of a generally U-shaped hook and includes a leg 58 having an inner end 60 between walls 40 and 42 of body 28 at end 32 thereof. Hook 36 further includes a leg 59 which, together with leg 58, provides for the open end of the hook to face inwardly toward end 32 of body 28. Hook 36 is pivotally mounted on body 28 by means of a pivot pin 62 which, as best seen in FIG. 5, extends through openings 64 and 66 therefor in side wall 42 and inner end 60 of leg 58, respectively, and has a threaded inner end 68 of reduced diameter received in a threaded opening 70 therefor in side wall 40. Pivot pin 62 provides for hook 36 to pivot relative to body 28 and thus hook 34 between the solid line and broken line positions shown in FIG. 4 and in which positions hooks 34 and 36 are respectively positioned for releasing the holder from and connecting the holder to hooks 22 and 24 of security device 12.

Hook 36 is releasably held in the broken line position thereof shown in FIG. 4 and, when released, is pivotal from the broken line position to the solid line position. More particularly in this respect, as seen in FIGS. 4 and 5 of the drawing, inner end 60 of leg 58 of hook 36 is provided with a recess 72 having an axis parallel to and radially spaced from the axis of pivot pin 62. Recess 72 slidably supports a release pin 74 which is biased axially toward side wall 40 of body 28 by means of a coil compression spring 76. Side wall 40 is provided with a recess 78 which is axially aligned with recess 72 when hook 36 is in the broken line position shown in FIG. 4. When recess 78 is aligned with recess 72, pin 74 is biased into recess 78 and interengages therewith to preclude pivotal displacement of hook 36 relative to body 28. A manually operable plunger 80 is provided for selectively displacing release pin 74 axially inwardly of recess 72 against the bias of spring 76 to release hook 36 for pivotal displacement relative to body 28. Plunger 80 includes a stem 82 having a headed inner end 84 in recess 78 and having an outer end provided with operating knob 86 for displacing the plunger and thus release pin 74 axially inwardly of recess 72. Head 84 of the plunger engages the bottom of recess 78 to limit the displacement of release pin 74 into recess 78, and the inner end of knob 86 is axially spaced from outer surface 88 of side wall 40 a distance equal to the length of the outer end of pin 74 which is received in recess 78. Accordingly, it will be appreciated that depression of plunger 80 displaces the outer end of release pin 74 to a position coplanar with the inner surface 90 of side wall 40, thus releasing hook 36 for pivotal movement relative to body 28. Preferably, the outer side of side wall 40 of body 28 is provided with a protective shroud 92 extending about knob 86 to preclude unintended depression of plunger 80 and thus release of hook 36.

Hook 36 is spring biased from the broken line toward the solid line position shown in FIG. 4 by a leaf spring 94. Spring 94 has an outer end underlying leg 44 of hook 36 and secured to bottom portion 38 of body 28 by means of a threaded fastener 96 and an inner end 98 engaging against a radially outwardly extending finger 100 on inner end 60 of leg 58 of hook 36. It is also preferred to limit pivotal displacement of hook 36 in opposite directions about pivot pin 62 and, for this purpose, the radially outer periphery of inner end 60 of leg 58 is recessed to provide circumferentially opposed abutment surfaces 102 and 104 adapted to engage against a stop pin 106 extending between and secured to side walls 40 and 42 of body 28. As will be appreciated from FIG. 4, abutment surface 102 and pin 106 are adapted to interengage to limit pivotal displacement of hook 36 in the direction from the solid line to the broken line position thereof, and abutment surface 104 is adapted to engage with pin 106 to limit displacement of hook 36 in the opposite direction.

Holder 10 is securely anchored relative to the vehicle by a tether 108 which is preferably in the form of a link chain having a link 110 at one end thereof secured to body 28 of the holder and a link 112 at the other end thereof secured to a rigid part 114 of the vehicle, such as a floor plate or frame member, by means of an anchoring bracket 116 which is bolted or otherwise secured to part 114. The tether could also, for example, be connected to a vehicle seat support rail, or a floor mounted seat belt anchoring bracket, either directly or through a special anchoring bracket for the holder, such as bracket 116. In the embodiment illustrated, lower portion 38 of body 28 of the holder is provided with a recess 118 receiving link 110 of tether 108, and a threaded fastener 120 extends through lower body portion 38 and across recess 118 to secure link 110 and thus the tether to the holder.

It is believed that operation of holder 10 will be obvious from the drawings and from the foregoing description. Briefly in this respect, when it is desired to release holder 10 from its connected position with a security device 12 as shown in FIG. 1, plunger 86 is depressed and spring 94 biases hook 36 from the broken line to the solid line position shown in FIG. 4. The holder can then be removed from the security device enabling the latter to be attached to the vehicle steering wheel for its intended purpose. When it is desired to connect holder 10 to security device 12 in conjunction with storage of the latter, the holder is positioned relative to engagement members 22 and 24 of the security device as shown by the solid line position of the holder in FIG. 4. Hook 36 is then pivoted from the solid line to the broken line position thereof to connect the holder to the security device which is then placed in the storage area therefor in the vehicle. The adjustability of hook 34 relative to body 28 and thus hook 36 facilitates spacing the hooks 34 and 36 so as to accommodate lock bar devices in which hooks, such as hooks 22 and 24 of device 12, have different spacings in the storage position. If desired, in connection with a security device of the type illustrated in FIG. 1, engagement member 22 thereof can be adjusted to the right in FIG. 4, further into the closed end of hook 36 of the holder, to enhance the integrity of the connection between the holder and security device. When stored in the vehicle, tether 108 limits displacement of the security device relative to the storage area in the event of a sudden stopping of the vehicle.

Figure 6:
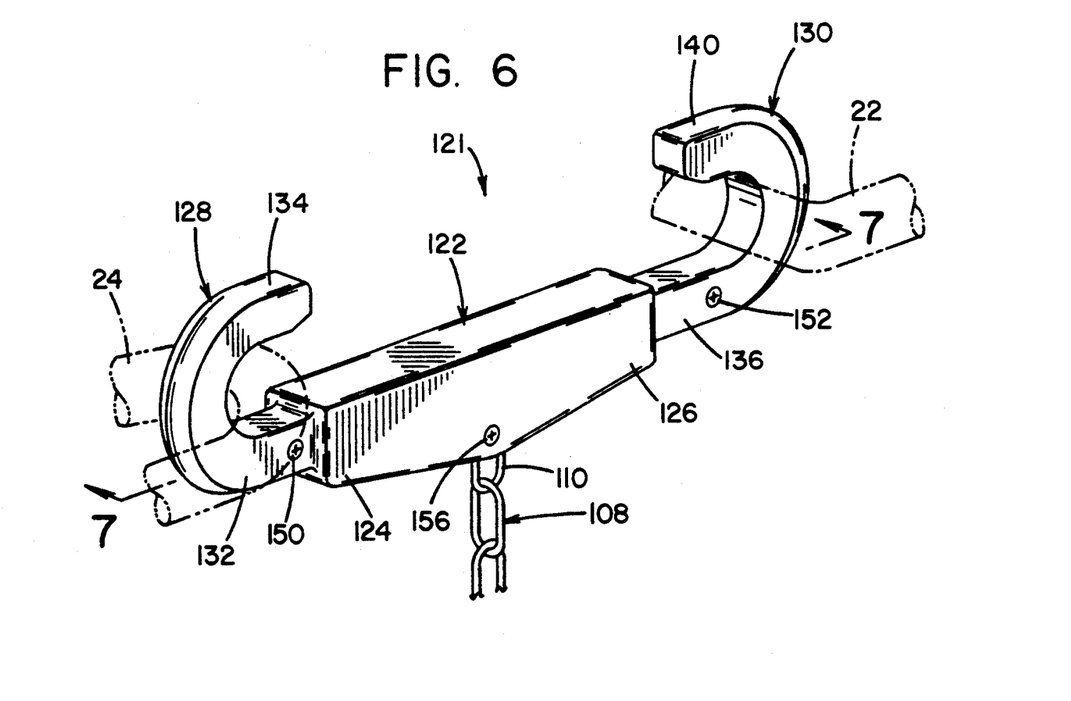
FIGS. 6 is a perspective view of another embodiment of a tethered holder in accordance with the present invention.
Figures 7, 8:
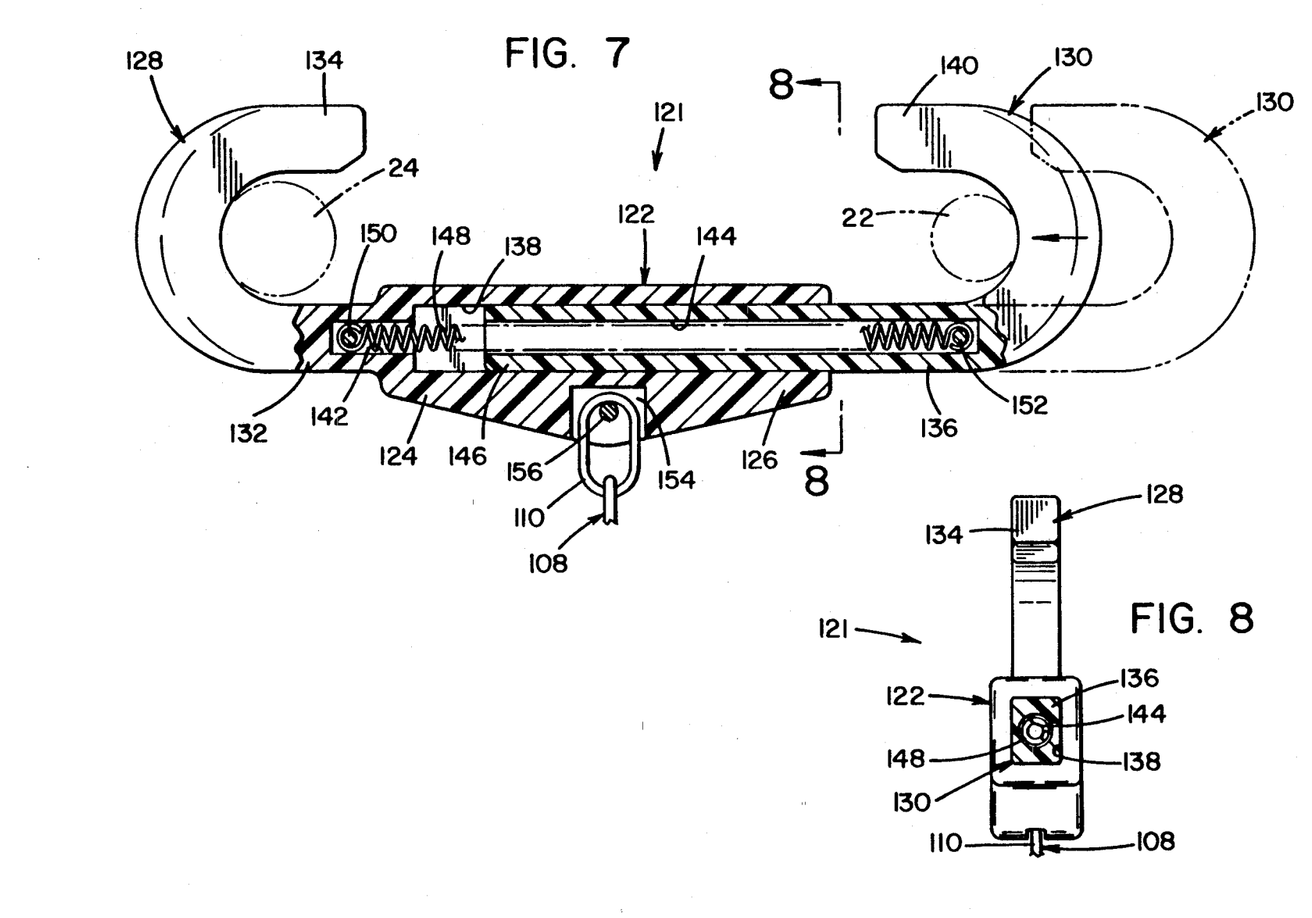

Another embodiment of a holder in accordance with the present invention is illustrated in FIGS. 6–8 of the drawing in conjunction with a security device of the type illustrated in FIG. 1 and accordingly including hook-type engagement members 22 and 24. In this embodiment, the holder 121 comprises a body 122 having opposite ends 124 and 126, a connector 128 at end 124, and a connector 130 at end 126. Preferably, body 122 and connectors 128 and 130 are of high impact strength plastic material such as Delrin. Connector 128 is in the form of a U-shaped hook having a leg 132 integral with body 122 at end 124 thereof and having a second leg 134 which, together with leg 132 and the closed portion of the U provides for the hook to have an open end facing end 124.

Connector 130 is in the form of a U-shaped hook having a leg 136 slidably received and supported in a bore 138 therefor in body 122 and having a leg 140 which, together with leg 136 and the closed end of the U provides for the hook to have an open end facing end 126 of the body. Preferably, bore 138 and leg 136 are of rectangular cross-sectional configuration so as to maintain hooks 128 and 130 in opposed alignment during displacement of hook 130 relative to body 122 and thus hook 128. Bore 138 extends into body 122 from end 126 toward end 124 and terminates at its inner end in a smaller diameter bore 142 which extends a short distance into leg 132 of connector 128. Leg 136 of hook 130 is provided with a bore 144 extending thereinto from inner end 146 thereof, and leg 136 and thus hook 130 is biased inwardly toward end 126 of the body by a tension coil spring 148. Spring 148 has one end secured in bore 142 by a threaded fastener 150 extending through leg 132 of hook 128 and has its opposite end secured in bore 144 by a threaded fastener 152 extending through leg 136 adjacent the outer end thereof. Hook 130 is axially slidably displaceable relative to body 122 and hook 128 between the solid line and broken line positions thereof shown in FIG. 7 and in which positions the holder 120 is respectively connected to and positioned for disconnection from engagement members 22 and 24 of the security device. In both positions of connector 130 the open ends of the hooks are in opposed alignment with one another.

In this embodiment, a tether 108 as described hereinabove in conjunction with the embodiment in FIGS. 1–5 has end link 110 thereof disposed in a recess 154 in the bottom of body 122 and secured to the body by a threaded fastener 156 extending through the body and recess 154. The opposite end of the tether is secured to the vehicle as described in the earlier embodiment.

When it is desired to attach holder 121 to the engagement members of a security device in connection with storage of the latter, hook 128 is engaged with engagement member 24 of the security device, and hook 130 is displaced axially outwardly of body 122 and then swung upwardly relative to engagement member 22 to the broken line position shown in FIG. 7. hook 130 is then released, whereupon spring 148 biases the hook to the solid line position shown in FIG. 7 in which hooks 128 and 130 engage engagement members 22 and 24 to complete the attachment. The security device is then placed in its storage area in the vehicle and, as described above, the tether limits displacement of the security device from the storage area in the event of a sudden stopping of the vehicle. It will be appreciated that release of holder 121 from the security device is readily achieved by displacing hook 130 from the solid line to the broken line position thereof shown in FIG. 7 and then swinging the holder downwardly until hook 130 clears engagement member 22. Thereafter, hook 130 is released and spring 148 biases the latter inwardly toward end 126 of body 122.

While considerable emphasis has been placed herein on the structures of the preferred embodiments of the holder and the association of the holder with a vehicle security device having a specific structure, it will be appreciated that many embodiments of the holder in accordance with the present invention can be made and that many changes can be made in the preferred embodiments herein illustrated and described without departing from the principles of the invention. It will be further appreciated that the holders of the preferred embodiments as well as those of other embodiments and modifications of the preferred embodiments can be used in conjunction with security devices other than that specifically illustrated herein. With regard to the latter, for example, the steering wheel mountable security device could be a steering wheel lock bar of different construction than that disclosed herein, or could be a device other than a steering wheel lock bar. In any event, the security device could be provided with engagement members for the holder separate from the member or members which are provided specifically to facilitate mounting of the security device on the vehicle steering wheel, such as the hooks 22 and 24 of security device 12 illustrated herein. With regard to the holder for the security device, the connectors at opposite ends thereof could be other than hooks, and the hooks in the embodiments herein illustrated and described could be structured for the open ends thereof to face outwardly of the ends of the body rather than inwardly. In connection with the latter modification, the spring in the second embodiment herein would bias the one connector outwardly of the body rather than inwardly. With further regard to the second embodiment, both of the connectors could be spring biased inwardly of the body. With regard to the first embodiment described herein, the one connector could be integral with the body rather than adjustably mounted thereon, and both of the connectors could be pivotally mounted on the body. The foregoing and other modifications of the preferred embodiments, as well as other embodiments of the invention, will be obvious or suggested to those skilled in the art from the disclosures of preferred embodiments herein, whereby it is to be distinctly understood that the foregoing descriptive matter is to be interpreted merely as illustrative of the present invention and not as a limitation.

Having thus described the invention, it is claimed:

1. A holder, for a security device attachable to a vehicle steering wheel to limit rotation thereof, said holder comprising connector means having a first position connecting said holder to said security device and a second position disconnecting said holder from said security device, and tether means connected to said holder for securing said holder to said vehicle wherein said connector means includes first and second connector means, body means supporting said first and second connector means, and said second connector means being supported on said body means for displacement relative thereto and to said first connector means between first and second connector positions corresponding respectively to said first and second positions of said connector means.

2. A holder according to claim 1, wherein said connector means include first and second connector means relatively displaceable between said first and second positions, and means restraining displacement of said connector means from said first toward said second position.

3. A holder according to claim 1, wherein said connector means include first and second hook means.

4. A holder according to claim 3, wherein said first and second hook means are generally U-shaped and disposed with the open ends thereof facing one another when said connector means are in said first position.

5. A holder according to claim 1, wherein said first connector means being fixed relative to said body means.

6. A holder according to claim 5, wherein said second connector means is mounted on said body means for pivotal displacement relative thereto and to said first connector means between said first and second connector positions.

7. A holder according to claim 6, wherein said first and second connector means include hook means.

8. A holder according to claim 7, wherein said hook means includes first hook means on said first connector means and second hook means on said second connector means, said first and second hook means being generally U-shaped and disposed with the open ends thereof facing one another when said second connector means is in said first connector position.

9. A holder according to claim 8, and means restraining displacement of said second connector means from said first toward said second connector position.

10. A holder according to claim 9, and means biasing said second connector means toward said second connector position.

11. A holder according to claim 9, wherein said means restraining displacement of said second connector means includes pin means displaceable between latched and unlatched positions relative to said second connector means, and spring means for displacing said second connector means from said first to said second connector position when said pin means is in said unlatched position.

12. A holder according to claim 5, wherein said second connector means is supported on said body means for linear displacement relative thereto and to said first connector means between said first and second connector positions.

13. A holder according to claim 12, wherein said first and second connector means includes hook means.

14. A holder according to claim 13, and means restraining displacement of said second connector means from said first toward said second connector position.

15. A holder according to claim 14, wherein said means restraining displacement of said second connector means includes spring means.

16. A holder according to claim 15, wherein said hook means includes first hook means on said first connector means and second hook means on said second connector means, said first and second hook means being generally U-shaped and disposed with the open ends thereof facing one another when said second connector means is in said first and second connector position.

17. A holder according to claim 16, wherein said hook means are closer together in said first connector position of said first and second connector means than in said second connector position thereof.

18. A holder, for a security device attachable to a vehicle steering wheel to limit rotation thereof and which security device includes means enabling connection of said holder thereto, said holder comprising body means having opposite ends, first hook means at one of said ends of said body means, second hook means at the other of said ends of said body means, means supporting said second hook means on said body means for displacement between first and second positions relative to said first hook means, said first and second hook means in said first position being engagable with said means on said security device to connect said holder thereto, said first and second hook means in said second position disengaging said means on said security device to release said holder therefrom, and tether means connected to said holder for securing said holder to said vehicle.

19. A holder according to claim 18, wherein said first hook means is adjustably mounted on said body means.

20. A holder according to claim 18, wherein said second hook means is mounted on said body means for pivotal displacement between said first and second positions.

21. A holder according to claim 20, and means releasably holding said second hook means in said first position.

22. A holder according to claim 21, and means biasing said second hook means from said first toward said second position.

23. A holder according to claim 22, wherein said first hook means is adjustably mounted on said body means.

24. A holder according to claim 23, wherein each said first and second hook means are U-shaped with the open end thereof facing the corresponding one of said opposite ends of said body means.

25. A holder according to claim 24, wherein said tether means includes flexible link chain means having opposite ends, one of said ends of said chain means being connected to said body means.

26. A holder according to claim 18, wherein said second hook means is supported on said body means for sliding displacement between said first and second positions.

27. A holder according to claim 26, and means biasing said second hook means toward said first position.

28. A holder according to claim 26, wherein each said first and second hook means are U-shaped with the open end thereof facing the corresponding one of said opposite ends of said body means.

29. A holder according to claim 28, and spring means interconnecting said body means and said second hook means and biasing said second hook means toward said first position.

30. A holder according to claim 29, wherein said first hook means is integral with said body means.

31. A holder according to claim 30, wherein said tether means includes flexible link chain means having opposite ends, one of said ends of said chain means being connected to said body means.

32. A holder, for a security device attachable to a vehicle steering wheel to limit rotation thereof and which security device includes means enabling connection of said holder thereto, said holder comprising body means having opposite ends, first U-shaped hook means on one of said ends with the open end of the U facing said one end, second U-shaped hook means, means mounting said second hook means on the other of said opposite ends for pivotal displacement in opposite directions between first and second positions relative to said first hook means, the open end of the U of said second hook means facing said other end of said body means and being in opposed and aligned relationship with said open end of the U of said first hook means when said second hook means is in said first position, means releasably holding said second hook means in said first position, and tether means for securing said holder to said vehicle.

33. A holder according to claim 32, wherein said first hook means includes leg means extending inwardly of said body means from said one end, and means for selectively interconnecting said leg means and body means to adjust the position of said first hook means relative to said one end.

34. A holder according to claim 32, and means to limit said pivotal displacement of said second hook means in said opposite directions.

35. A holder according to claim 32, and means biasing said second hook means in the direction from said first toward said second position.

36. A holder according to claim 32, wherein said second hook means includes leg means having an inner end in said body means at said other end thereof, said means mounting said second hook means on said outer end including pivot pin means between said body means and said inner end of said leg means.

37. A holder according to claim 36, wherein said means releasably holding said second hook means in said first position includes release pin means mounted in said inner end of said leg means on an axis parallel to and radially spaced from said pivot pin means, recess means in said body means axially aligned with said release pin means, means biasing said release pin means into said recess means to engage said second hook means against pivotal displacement relative to said body means, and manually operable means on said body means for displacing said pin means from said recess means to disengage said second hook means for pivotal displacement relative to said body means.

38. A holder according to claim 37, wherein said manually operable means includes plunger means.

39. A holder according to claim 37, and means to limit said pivotal displacement of said second hook means in said opposite directions.

40. A holder according to claim 37, and means biasing said second hook means in the direction from said first toward said second position.

41. A holder according to claim 39, wherein said means to limit said pivotal displacement includes stop pin means in said body means parallel to and radially spaced from said pivot pin means and abutment means on said inner end of said leg means of said second hook means.

42. A holder according to claim 41, and spring means in said body means engaging said inner end of said leg means of said second hook means to bias said second hook means in the direction from said first toward said second position.

43. A holder according to claim 42, wherein said first hook means includes leg means extending inwardly of said body means from said one end, and means for selectively interconnecting said leg means and body means to adjust the position of said first hook means relative to said one end.

44. A holder according to claim 43, wherein said manually operable means includes plunger means.

45. A holder according to claim 44, wherein said tether means includes flexible link chain means having opposite ends, one of said ends of said chain means being connected to said body means between said opposite ends thereof.

46. A holder, for a security device attachable to a vehicle steering wheel to limit rotation thereof and which security device includes means enabling connection of said holder thereto, said holder comprising body means having opposite ends, first U-shaped hook means on one of said ends with the open end of the U facing said one end, second U-shaped hook means at the other of said opposite ends with the open end of the U facing said other end and being in opposed and aligned relationship with said open end of the U of said first hook means, said body means having an opening therein from said other end and extending toward said one end, said second hook means including leg means extending into said opening and slidably interengaging therewith to support said second hook means for displacement outwardly and inwardly relative to said other end of said body means between first and second positions relative to said first hook means, said second hook means being closer to said first hook means in said first position than in said second position, means restraining displacement of said second hook means from said first toward said second position, and tether means for securing said holder to said vehicle.

47. A holder according to claim 46, wherein said first hook means is integral with said body means.

48. A holder according to claim 46, wherein said means restraining displacement of said second hook means is spring means.

49. A holder according to claim 48, wherein said leg means of said second hook means has an end in said opening in said body means and a bore extending from said end in the direction toward said other end of said body means, said opening in said body means having an inner end adjacent said one end of said body means, a bore in said body means extending from said inner end of said opening in the direction toward said one end of said body means, and said means restraining displacement of said second hook means including spring means in said bores in said body means and leg means and having opposite ends connected one to said body means and the other to said leg means.

50. A holder according to claim 49, wherein said first hook means is integral with said body means.

51. A holder according to claim 50, wherein said tether means includes flexible link chain means having opposite ends, one of said ends of said chain means being connected to said body means between said opposite ends thereof.

* * * * *